(12) United States Patent
Moore et al.

(10) Patent No.: US 8,111,435 B2
(45) Date of Patent: Feb. 7, 2012

(54) DOCUMENT READER HAVING A DOCUMENT REGISTRATION AND RETENTION SYSTEM

(75) Inventors: Michael J. Moore, Beverly Hills, MI (US); John Gudenburr, Canton, MI (US); Sammy C. Hutson, Novi, MI (US)

(73) Assignee: Burroughs Payment Systems, Inc., Plymouth, MI (US)

(*) Notice: Subject to any disclaimer, the term of this patent is extended or adjusted under 35 U.S.C. 154(b) by 797 days.

(21) Appl. No.: 12/145,743

(22) Filed: Jun. 25, 2008

(65) Prior Publication Data

US 2009/0323142 A1 Dec. 31, 2009

(51) Int. Cl.
*H04N 1/04* (2006.01)
*G06K 9/00* (2006.01)

(52) U.S. Cl. ........ 358/497; 358/474; 358/494; 358/471; 358/473; 382/137; 382/140; 382/312; 382/320

(58) Field of Classification Search .................. 358/488, 358/486, 497, 494, 474, 505; 382/137–140, 382/320, 312; 235/379
See application file for complete search history.

(56) References Cited

U.S. PATENT DOCUMENTS

| | | | |
|---|---|---|---|
| 4,996,775 A | 3/1991 | Sass et al. | |
| 5,239,759 A | 8/1993 | Dudek | |
| 5,519,511 A | 5/1996 | Tanahashi | |
| 6,721,072 B1* | 4/2004 | Tsai et al. | 358/471 |
| 7,469,824 B1* | 12/2008 | Crews et al. | 235/379 |
| 2009/0148028 A1* | 6/2009 | Gudenburr et al. | 382/139 |
| 2009/0323140 A1* | 12/2009 | Moore et al. | 358/497 |
| 2009/0323141 A1* | 12/2009 | Moore et al. | 358/497 |

FOREIGN PATENT DOCUMENTS

GB 2303512 2/1997

OTHER PUBLICATIONS

International Search Report dated Jul. 31, 2009 regarding PCT/US2009/048603.
Office Action dated Jun. 30, 2011 relating to U.S. Appl. No. 12/145,743.

* cited by examiner

*Primary Examiner* — Cheukfan Lee
(74) *Attorney, Agent, or Firm* — Honigman Miller Schwartz and Cohn LLP (57) ABSTRACT

A document scanning device and method of use are disclosed. The document scanning device includes a document bed and one or more document retention devices positioned along the document bed to define a document positioning surface. The document scanning device also includes a scanning module slidably attached to the document bed to pass over the document positioning surface. The document retention device retains a document in place on the document positioning surface as the scanning module slides over the document.

24 Claims, 5 Drawing Sheets

DOCUMENT READER HAVING A DOCUMENT REGISTRATION AND RETENTION SYSTEM

TECHNICAL BACKGROUND

The present disclosure relates generally to features of a document reader. More specifically, the present disclosure relates to a document registration and retention system for a document reader.

BACKGROUND

Electronic document reading and imaging systems are commonly employed in situations that require cost-effective and efficient methods to record and process respective document information. For example, various commercial service and business industries have found it advantageous to electronically scan and read relevant check information using portable on-site document scanning devices. One benefit of this approach relates to an inherently expedited check processing ability. This is because the check information is immediately available. The need to transport the check to a specialized check processing facility is eliminated, thereby avoiding the substantial delays and losses necessarily incurred by check transportation and handling.

Document scanning devices used in these instances are generally low cost devices that are designed to process a relatively low volume of checks, typically on a check-by-check basis. These devices can include a movable, linear scanning mechanism employed to acquire image and routing information of the check during a scanning process. During the scanning process, a scanning element such as a contact image sensor or a magnetic character reader is either directly in contact or in close proximity with the check. As the scanning mechanism is moved lengthwise along the check, a frictional force can occur between the scanning element and the document. The frictional force between the scanning element and the document can cause the document to move during the scanning process, thereby potentially damaging the document and introducing a document skew into the scanned image that can render captured image and routing information unreadable.

For these and other reasons, improvements are desirable.

SUMMARY

In accordance with the following disclosure, the above and other problems are solved by the following:

In a first aspect, a document scanning device is disclosed. The document scanning device includes a document bed and one or more document retention devices positioned along the document bed to define a document positioning surface. The document scanning device also includes a scanning module slidably attached to the document bed to pass over the document positioning surface. The document retention device retains a document in place on the document positioning surface as the scanning module slides over the document.

In a second aspect, a method of capturing information from a printed document is disclosed. The method includes placing a document on a document positioning surface of a document bed, the document bed having a plurality of registration assemblies extending therethrough to retain the document in a stationary position during a document scanning procedure. The method also includes scanning at least a portion of the document by moving a scanning module across a surface of the document to capture information printed on the surface and processing the scanned document information.

In a third aspect, a check scanner is disclosed. The check scanner includes a document bed and a plurality of document retention devices positioned on the document bed to define a check positioning surface, the plurality of document retention devices each including a spring-biased pin movable between extended and retracted positions. The check scanner further includes a scanning module slidably attached to the document bed to pass over the check positioning surface, the scanning module including an actuation surface facing the check positioning surface and arranged to, as the scanning module slides across the check positioning surface, engage one or more of the document retention devices, moving the devices from an extended position to a retracted position.

DETAILED DESCRIPTION

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present disclosure relates generally to a document scanner, such as a check scanner. The document scanner includes a registration and retention system for the document scanner, designed to retain documents in the document scanner during a scanning process. The document scanner of the various embodiments of the present disclosure generally corresponds to a scanning system in which a stationary document interacts with a movable scanning system that contacts and passes across a surface of the document. Using the registration and retention system of the present disclosure, potential document skew caused by interaction between the document and the scanner is reduced. Subsequently, accuracy of the document scanner is maintained and potential logistical issues such as document jamming or damage are reduced.

Figure 1:
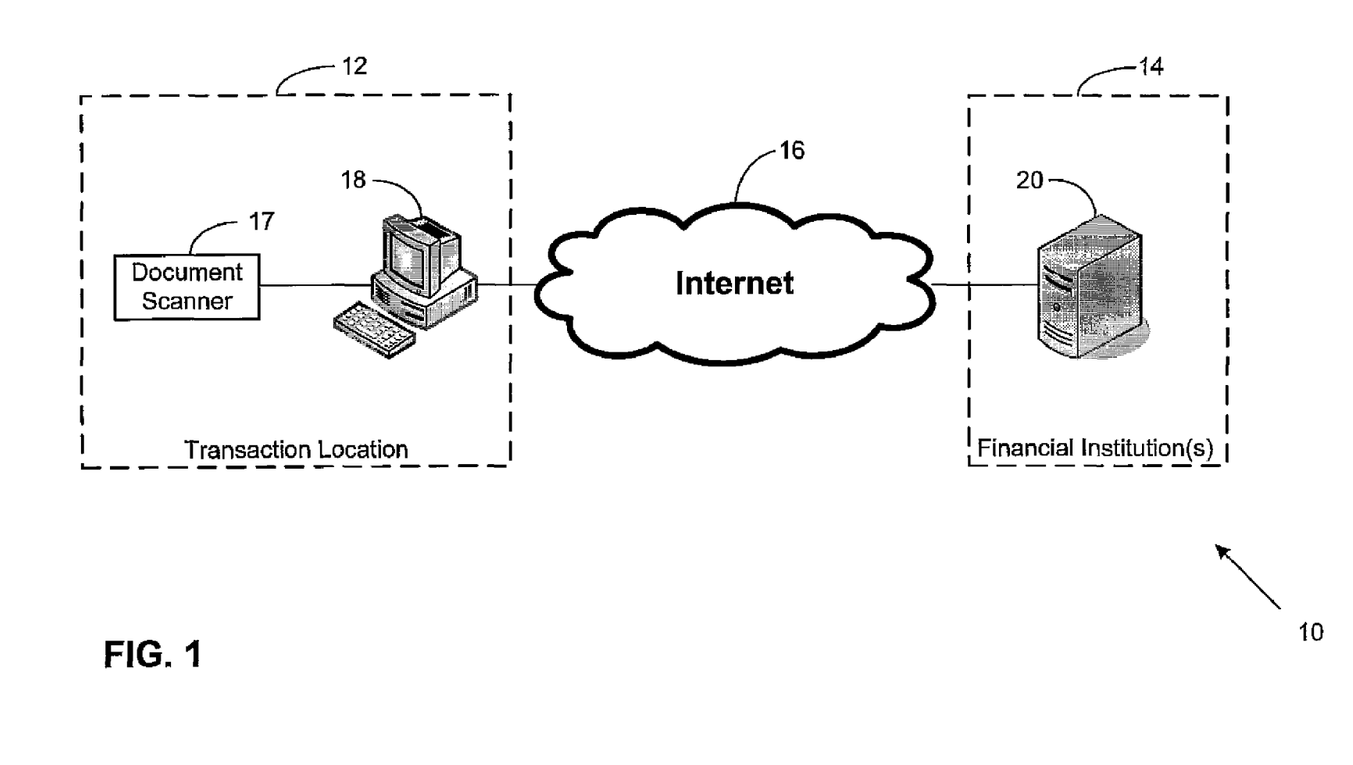
FIG. 1 is a schematic depiction of a network in which a document scanner having features in accordance with the present disclosure may be utilized.

One specific example of a system incorporating a document reader or scanner having the disclosed document positioning and retention system is shown in FIG. 1. Specifically, FIG. 1 illustrates a schematic view of a network 10 in which a financial transaction may take place, according to a possible embodiment of the present disclosure. The network 10 generally includes one or more transaction locations 12 and financial institutions 14, communicatively connected by a network, shown as an internet connection 16. A transaction location 12 may be any of a number of places of business at which a financial transaction may take place, such as for purchase or sale of goods and services. Example transaction locations may include restaurants, supermarkets, retail stores, or other places of business. Each transaction location includes a document scanner 17 interconnected with a computing system 18. The document scanner 17 is arranged to provide the transaction location with the ability to electronically acquire information about a printed document, such as a check used for payment in exchange for goods and/or services. In certain embodiments, the document scanner 17 can be a check scanner, which is sized and designed to be a low cost solution to read account information on personal checks and scan images of one or both sides of the check. An example document scanner useable in the network 10 is described below in conjunction with FIGS. 2-3.

The computing system 18 can be any of a number of types of computing systems, such as a general purpose personal computer, or a specialized computer such as a cash register or inventory system. The computing system 18 can interconnect with the document scanner 17 by any of a number of standard or specialized communication interfaces, such as a USB, 802.11 a/b/g network, RF, infrared, serial, or other data connection In certain embodiments, the computing system 18 runs an application configured to control the document scanner 17; in further embodiments, the computing system receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the network 10 as well.

The internet connection 16 depicted can be any of a number of WAN, LAN, or other packet based communication networks such that data can be shared among a number of computing systems or other networked devices. Furthermore, although in the embodiment shown two computing devices 18, 20 at different, specific locations are depicted, the computing devices and/or the document scanner 17 may be located at the same location or within the same network.

Figure 2:
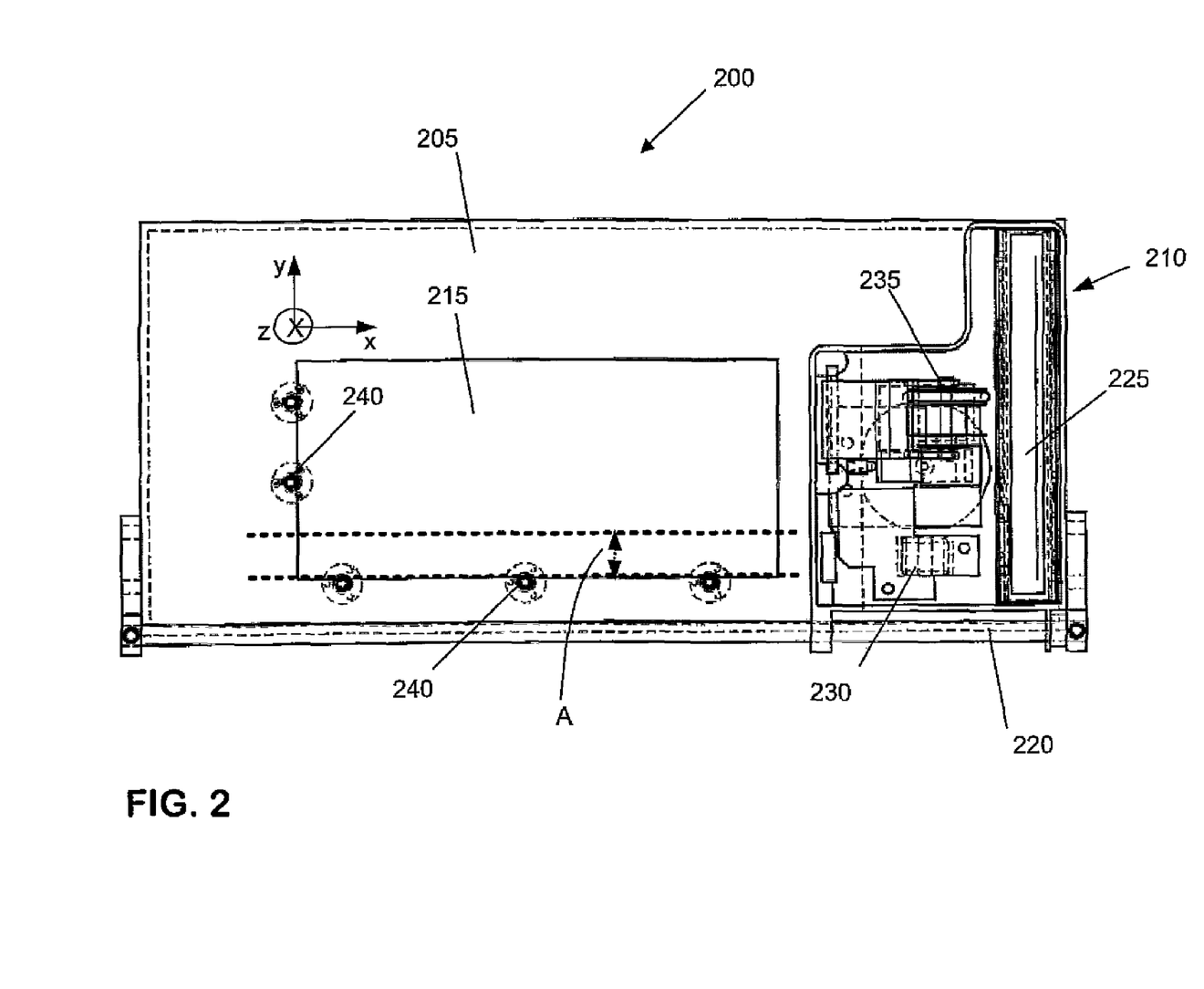
FIG. 2 shows a top schematic view of a document scanner according to a possible embodiment of the present disclosure.

Referring now to FIG. 2, a document scanner 200 is shown according to a possible embodiment of the present disclosure. In general, the document scanner 200 is a document processing system which can be used to capture image and character information of a document obtained during a scanning procedure. The document scanner 200 can be incorporated into the network 100 as detailed in FIG. 1; however, the document scanner 200 can be incorporated into other types of systems as well, such as networks in which no persistent communicative connection exists between a transaction location and a financial institution.

In the example embodiment shown, the document scanner 200 generally includes a document bed 205, a scanning module 210 and a plurality of registration assemblies 240. The document bed 205 provides a substantially level surface on which documents, such as personal checks or other scannable items, can be placed. The document bed 205 can be made from or otherwise include a high-friction material, such as a rubber or high-friction plastic material, which assists in maintaining the position of a check or other document in contact with the document bed 205. The document bed 205 can, in certain embodiments, correspond to a top surface of an electronic device that interfaces with a computing system, as described in FIG. 1. In such embodiments, the document scanner 200 can also include various other electronics, memory, or other systems for image and data processing and storage.

The document bed 205 includes a document positioning surface 215 specifically sized to receive the document. In the example embodiment the document positioning surface 215 is sized to receive a check (e.g. a personal check). In such embodiments, the document positioning surface can be at least approximately 6 inches in length by approximately 2¾ inches in height. However, it will be appreciated that the document bed 205 and the document positioning surface 215 can be modifiable such that any number of different types of documents having different dimensions can be scanned.

In the embodiment shown, the scanning module 210 is approximately the same width as the document bed 205 and/or document positioning surface 215 and is configured to pass over a document placed on the document positioning surface 215 during a scanning operation. The scanning module 210 can include one or more integral scanning elements designed to capture information about the document during the scanning procedure. It will be appreciated that the scanning module 210 can pass over the document, scanning the document in a unidirectional and/or bidirectional manner depending on the configuration of the document scanner 200.

In the embodiment shown, the scanning module 210 is passed over the document to scan the document in a unidirectional fashion, guided along the length of the document by a slider bar 220 connected or formed along an edge of the document bed 205. The slider bar 220 provides a mounting location for the scanning module 210, allowing the scanning module 210 to slide along the length of the document placed on the document positioning surface 215. To scan a document or other item, the scanning module 210 is moved from a default starting position (as shown in FIG. 2) along the length of the document bed 205, as guided by the slider bar 220. When the scanning module 210 reaches the opposite side of the document bed, the scanning process is complete, and the scanning module 210 can be returned to the default starting position.

In the embodiment shown, the scanning module 210 includes at least a contact image sensor (CIS) 225, a magnetic ink character reader (MICR) 230, and a radial encoder 235. The CIS 225 includes a linear scan element which can be used to scan an image of a document placed on the document positioning surface 215. In the embodiment shown, the CIS 225 is arranged to pass within approximately 0.01 inches of the check during the scanning procedure. The data gathered by the CIS 225 can be combined with image resolution information and speed information of the scanning module 210 (as captured by the radial encoder 235) as it moves across the document to transform data collected by the CIS 225 into an image. Subsequently, the image can be communicated from the document scanner 200 to other computing systems (e.g. computing system 130 of FIG. 1) by way of a communications interface (e.g. network 115 as illustrated in FIG. 1) or stored in a memory element managed by circuitry incorporated into the document scanner 200.

The MICR 230 generally is used to interpret magnetic features representing alphanumeric characters printed on or embedded in a document. In this fashion, as the scanning module 210 moves along the length of the document positioning surface 215, the MICR 230 is positioned to be in contact with a check during a scanning procedure at a position where magnetic characters are expected. In the figure shown, the MICR 230 traverses a path having a width of dimension 'A' to read magnetic characters representing account and routing information. This magnetic character reading generally requires precise registration of the check with respect to the MICR 230, to ensure accuracy.

In the embodiment shown, a radial encoder 235 is also incorporated into the scanning module 210, and is used to calculate a speed of travel of the scanning module along the document bed 205. The radial encoder 235 includes a rotating element having a plurality of discrete indicators, such as differential colors or physical characteristics A rate of rotation of the rotating element may be detected by supporting circuitry to quantify the speed of the scanning module 210. The speed of travel, as determined by the radial encoder 235, is used in conjunction with information captured by the CIS 225 and MICR 230 as the MICR 230 reading magnetic characters during the scanning procedure, a radial encoder 235 The speed of the scanning module 210 as determined by the radial encoder 235 is used by the document scanner 200 to formulate a proper scanned image using the CIS 225 and to properly read magnetic characters using the MICR 230. The radial encoder 235 is in contact with the document during the scanning procedure and is subject to introducing document skew, e.g. by moving the document placed on the document positioning surface 215.

Due to potential contact between a document on the document positioning surface 215 and the various components in the scanning module 210 as the module is passed across the document, various registration arrangements can be utilized to reduce or eliminate check skew introduced due to the direct contact during the scanning procedure (e.g. to maintain the check in place relative to the document positioning surface). As shown in the example embodiment, integral with the document scanner 200 are a plurality of registration assemblies 240 arranged alongside a portion of the document bed 205 to define the document positioning surface 215. The registration assemblies 240 assist a user placing a document on the document positioning surface by receiving and aligning the document with respect to the scanning module 210, and providing resistance to movement of the document due to frictional force imparted on the document by contact with components of the scanning module 210.

Figure 3:
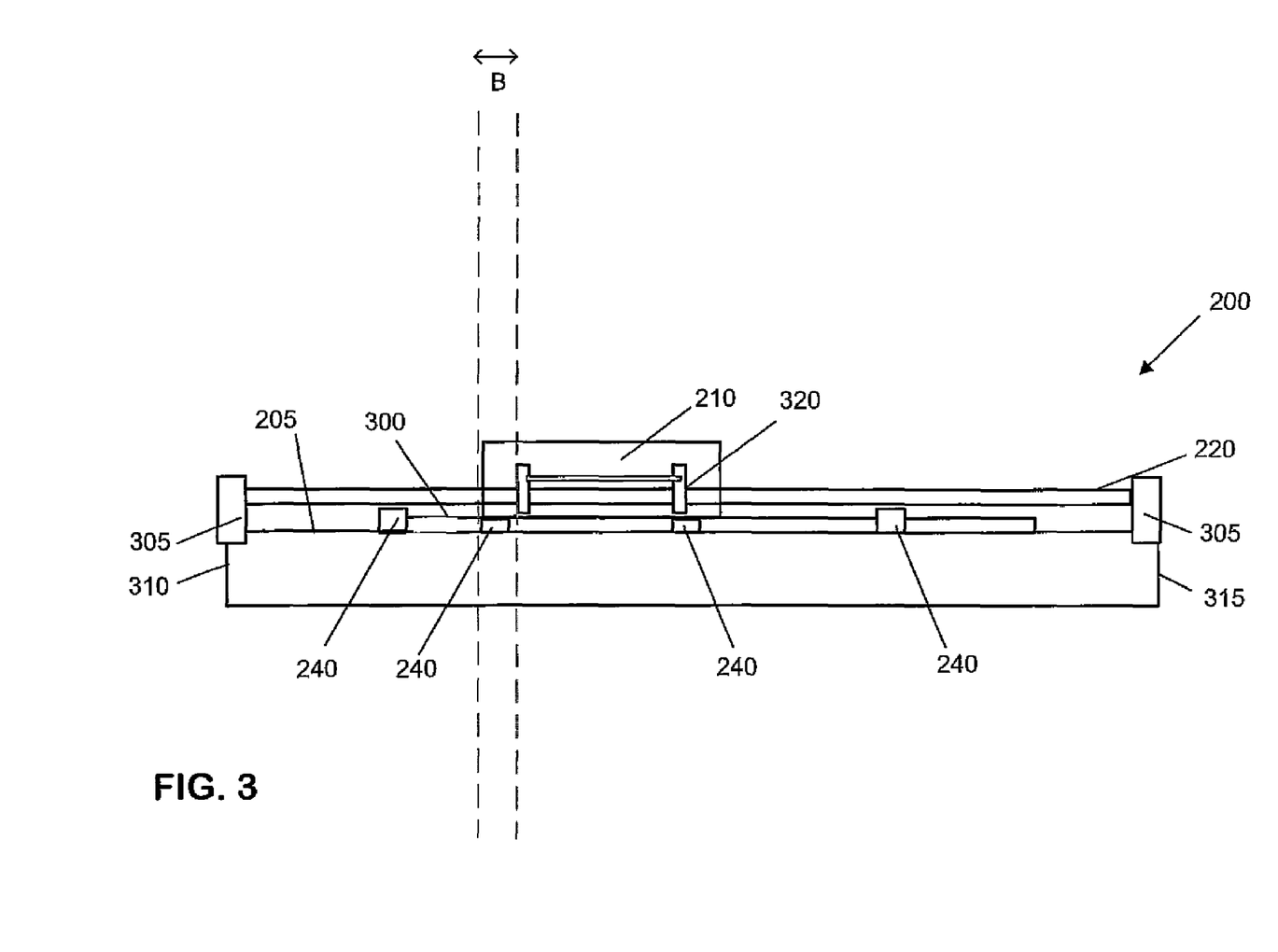
FIG. 3 shows a side schematic view of the document scanner as shown in FIG. 2.
Figure 4:
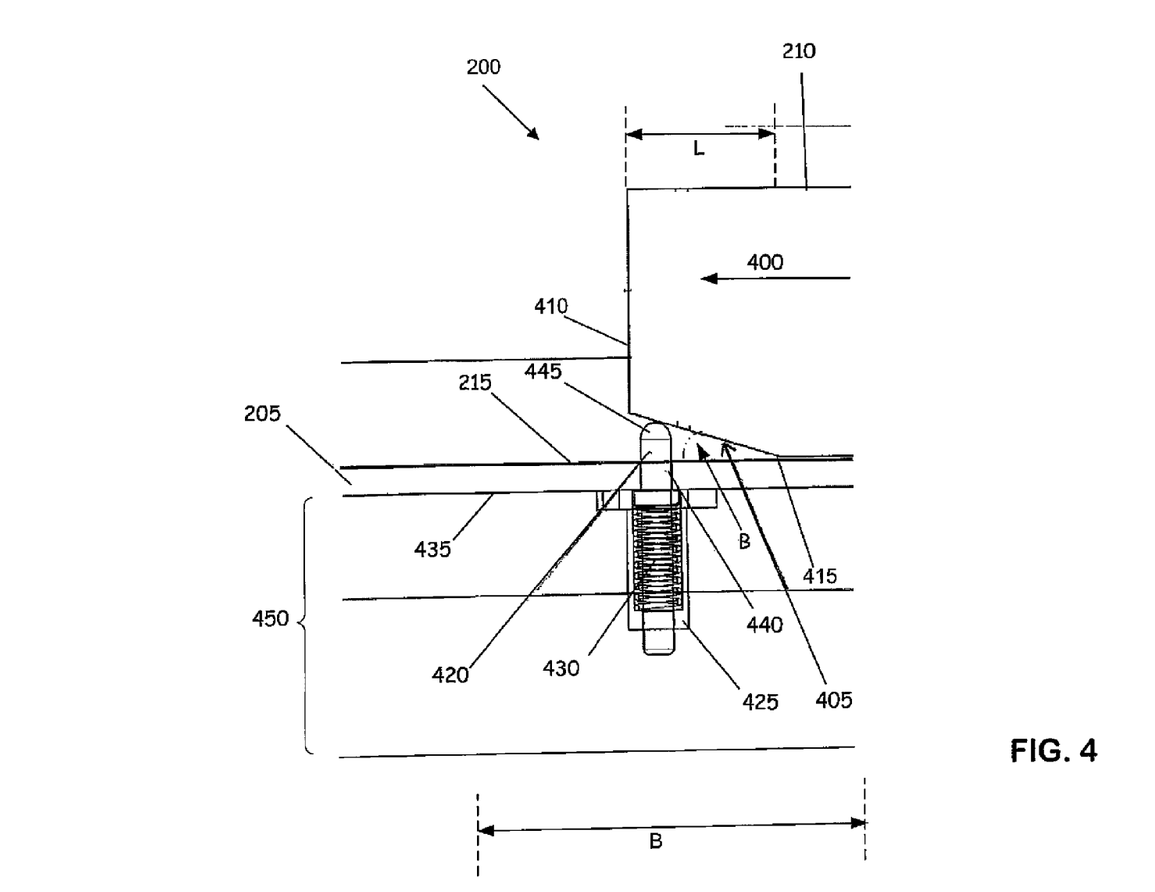
FIG. 4 is a side cross-sectional view of a portion of the document scanner of FIG. 2.

In the embodiment shown each individual registration assembly 240 includes at least a portion that partially extends above and below the document bed 205. These respective portions extend upward from the document bed 205, generally along z-axis whose orientation is normal to the document bed 205. In this particular embodiment, each registration assembly 240 generally includes a portion (e.g. a pin as shown in FIG. 4) extending through the document bed and movable between extended and retracted positions. The portion can be biased in the extended position, and engaged by the scanning module 210 to move to the retracted position (as shown in FIG. 3) as the scanning module 210 passes over the registration assembly 240. Details regarding the engagement between the scanning module 210 and a portion of a registration assembly 240 are described below in conjunction with FIGS. 3-4.

In the embodiment shown, the registration assemblies 240 located along a set of planar orthogonal axis, x and y, defining a portion of an outer perimeter of the document positioning surface 215.

In the example embodiment the registration assemblies 240 are configured to retain a check on the document positioning surface 215 such that an edge of the check is engaged with the respective portions of a pair of registration assemblies arranged on the y-axis and a second edge of the check is engaged with respective portions of three registration assemblies arranged on the x-axis. In this configuration, the document positioning surface 215 and orientation of the registration assemblies 240 can be configured to receive any document type and size, limited by the size of the document bed 205 and scanning module 210.

In the embodiment shown, five registration assemblies 240 are shown as included in the document scanner 200, positioned along two sides of a document positioning surface 215. Three registration assemblies are spaced at regular intervals along a longer side of the document positioning surface, and two registration assemblies are placed at an end of the document positioning surface opposite a default starting position of the scanning module 210.

Furthermore, in the embodiment shown, the registration assemblies 240 located along the x-axis of the document positioning surface 215 are positioned such that, as the scanning module 210 passes over a document placed on the surface, the registration assemblies are each sequentially engaged by the scanning module 210. The registration assemblies are positioned such that at least one of the registration assemblies remains exposed and unengaged from the scanning module 210 while the scanning module is passed over the document placed on the document positioning surface 215. This arrangement ensures that at least one registration assembly remains unengaged by the scanning module 210, allowing that registration assembly to remain fully extended to minimize movement of the document as the scanning module passes over the document.

In certain further embodiments, additional registration assemblies can be incorporated on those sides, or on other sides of the document. It is recognized that, by placing additional registration assemblies along a third or fourth side of the document positioning surface, the overall size of the document that can be placed on the document positioning surface is limited in that direction by the distance between opposing registration assemblies. Furthermore, fewer registration assemblies can be incorporated as well, to reduce cost of the overall document scanner, with a potential increased risk of document skew during a scanning process.

FIG. 3 is a side view of the document reader 200 as shown in FIG. 2. In the example as shown, a document 300 resides on the document bed 205 and, as noted in conjunction with the embodiment of FIG. 2, two edges of the document 300 are engaged by a plurality of registration assemblies 240. The registration assemblies 240 are arranged to receive and align the document 300 with respect to the scanning module 210, thereby facilitating the registration and retention of the document 300 on the document positioning surface 215 during the scanning procedure.

Additionally, as shown in FIG. 3, a mounting bracket 305 connects the slider bar 220 to the document bed 205, the mounting bracket having portions mounted to a first side 310 and a second side 315 of the document bed 205. A slider bracket 320 couples the scanning module 210 to the slider bar 220. In general, the slider bracket 320 can include portions defining a first bar aperture and a second bar aperture (not shown) such that the slider bar 220 can be inserted therein. The slider bar 220 slidably passes through the slider bracket 320 as the scanning module 210 is moved, allowing the scanning module to move across the document to perform the scanning procedure.

In FIG. 3, the scanning module 220 has been moved away from a default starting position, such that it is located over a document positioning surface 215. As shown, the scanning module 220 has engaged two registration assemblies 240, leaving at least one of the registration assemblies along at least one side of the document unengaged, as described previously.

Now referring to FIG. 4, a close-up, cross-sectional view of a portion of the document scanner 200 is shown, at dimension B of FIG. 3. In the example shown, the scanning module 210 is moving in a direction of motion 400 across a document positioning surface 215 during a scanning procedure. In general, during the scanning procedure, features integral to the scanning module 210 engage with portions of a plurality of registration assemblies 240 optimally orientated on the surface of tie documents bed 205. In practice, the plurality of registration assemblies 240 initially provide a securing mechanism such that a document can be positioned in an orientation conducive to the scanning procedure. Further, during the scanning procedure the plurality of registration assemblies 240 reduce unwanted movement of the document by at least partially counteracting a frictional force produced by motion of the scanning module 210 (e.g. components of the scanning module 210, including a MICR and/or radial encoder) in physical contact with the document.

In certain embodiments, the scanning module 210 includes an actuation surface 405, shown in FIG. 4 as a beveled inclined plane. The actuation surface 405 extends along a leading edge 410 of the scanning module, corresponding to the edge of the scanning module toward the document when the scanning module is in its default starting position. The actuation surface 405 extends from the leading edge of the scanning module 210 to a bottom surface 415 of the scanning module, through a distance L as projected onto the plane of the document positioning surface 215. In certain embodiments, the actuation surface 405 can be integrally formed with one or more edges of the scanning module 210.

FIG. 4 also illustrates a cross-sectional view of a registration assembly 240. The registration assembly 240 includes, in the embodiment shown, a spring loaded reciprocating pin 420. The reciprocating pin 420 is positioned within a guide sleeve 425, which allows the reciprocating pin to move between extended and retracted positions. In the extended position, at least a portion of the pin extends upward through the document bed 205 to define the document positioning surface 215. In the retracted position, the pin is depressed into the document bed 205 such that either a smaller portion of the pin extends upward through the document bed, or the pin is completely depressed into the document bed, such that a tip of the pin is either level with or below the level of the document positioning surface 215.

As the scanner module 210 slides across the document bed 205 (and across the document positioning surface 215), the actuation surface 405 engages the reciprocating pins 420, moving pins from the extended position to the retracted position. Once the scanner module 210 passes the retention apparatus 240, the reciprocating pin returns to the extended position.

The reciprocating pin 420 includes features that assist in ensuring smooth sliding movement of the scanning module 210 during the scanning procedure. For example, in the embodiment shown, the reciprocating pin 420 includes a parabolic tip 445 having a radius of curvature, R. A spring, 430 biases the reciprocating pin 420 upward through the document bed 205, and is chosen such that a minimal spring force, quantified by a spring constant, K, is imparted on the reciprocating pin 420. When the reciprocating pin 420 is moved to the retracted position, the spring force is counteracted by the downward force imparted on the pin by the actuating surface 405 as the scanning module 210 passes over the reciprocating pin 420.

In the example embodiment shown, the reciprocating pin 420 in the fully extended position extends to a distance of 0.125 inches above the document positioning surface. In a retracted position the reciprocating pin extends to a distance of 0.010 inches above the document positioning surface. In such an embodiment, the height of the reciprocating pin 420 over the document positioning surface 215 when in the retracted position is determined such that portions of the document are continuously in contact with portions of the reciprocating pin throughout the scanning procedure, thereby reducing the potential risk of skew imparted during the scanning procedure due to contact between the MICR and the radial encoder with document. However, in other embodiments, the pin can be completely depressed, allowing other registration assemblies placed at other locations along the document positioning surface to retain and register the document. Together, the reciprocating pins 420 of the various registration assemblies 240 absorb at least a portion of the drag force imparted by the scanning module during the scanning procedure. In the example embodiment the reciprocating pin is preferably manufactured from a low friction, high wear material such as Acetal or ultra high molecular weight polyethylene.

Regarding the interaction of the actuation surface 405 with the reciprocating pin 420, the distance L of the actuation surface is determined such that the length of the actuation surface, calculated as the hypotenuse of a right angle triangle, is sufficient to provide a smooth linear reciprocating or camming action for a respective reciprocating pin (examples of which are described below). In the example embodiment, the actuation surface has a 15 degree incline angle, B, as measured with respect to the document bed. In alternate example embodiments the actuation surface can have an incline angle between the range of about 0 degrees to about 90 degrees such that the camming action of the reciprocating pin is optimized by taking into account the relationship between the actuation surface and reciprocating pin, including the curvature of the tip, the spring constant, K, of the compression spring, and the speed with which the scanning module moves across the length of the document bed.

In the example embodiment, the guide sleeve 425 is affixed to an underside 435 of the document bed 205 or embedded within the document bed, enabling the reciprocating pin 420 to extend through the document bed 205 via a pin passage 440. The pin passage 440 extends from the underside 435 through to the document positioning surface 215 of the document bed 205.

The guide sleeve 425, extending through the pin passage 440, can be attached to the document bed 205 by a variety of methods. For example, the guide sleeve 425 can be welded to the underside 435 of the document bed 205. Alternatively, the guide sleeve 425 can be removably mounted to the underside 435 of the document bed 205 (e.g. via a screw and bolt assembly) such that registration assembly 240 configuration is adjustable and configurable to allow for any type of document of various size to be optimally orientated on the surface of the documents bed 205.

As shown in the example embodiment, the guide sleeve housing 425 is internalized in an enclosure 450 integrally formed with a bottom side of the document scanner 200. In addition to housing the guide sleeve housing 425, the enclosure 450 can also house other components necessary for operating the document scanner 200, as previously mentioned, such as a printed circuit board (not shown) having the necessary supporting circuitry to operate the document scanner in a network as shown in FIG. 1. For example, the printed circuit board (not shown) may include a front end module for signal processing and conditioning, a microprocessor, essential memory elements, or supporting I/O circuitry. Other electrical or mechanical features can be included within the enclosure 450 as well.

Figure 5:
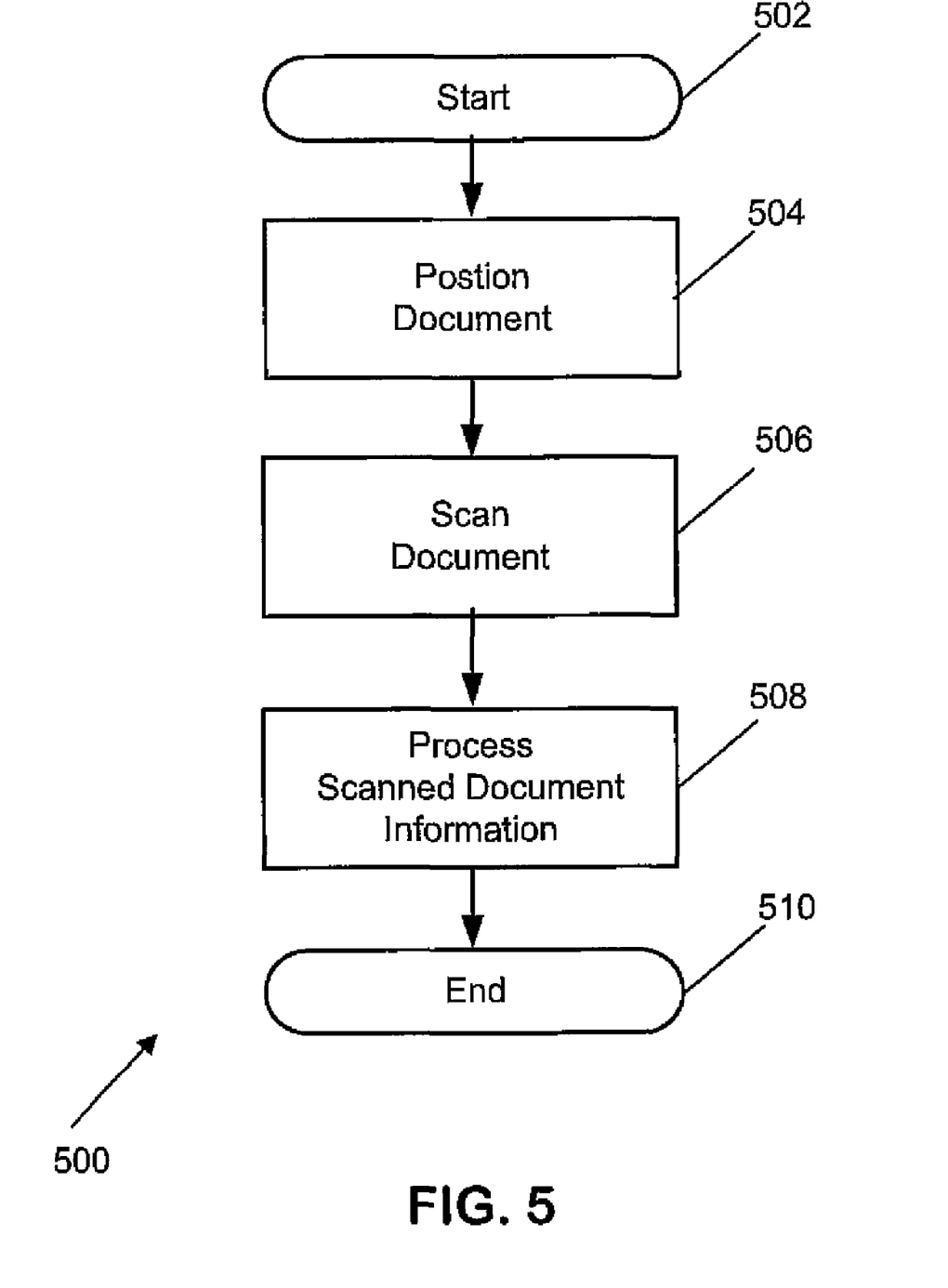
FIG. 5 is a flow diagram for a method to operate a document scanner having features in accordance with the present disclosure.

Referring now to FIG. 5, an example flowchart of methods and systems 500 for operation of the document scanner are discussed according to the possible embodiment of the present disclosure. The various embodiments of the methods and systems described herein are discussed in the context of a document scanner, which, in certain embodiments, can correspond to the document scanner 200 of FIGS. 2-4. In other embodiments, different types of document scanners having different arrangements of registration assemblies, scanning elements, and other features could be used as well.

The methods and systems 500 are instantiated at a start operation 502. Operational flow proceeds to a document placement module 504. The document placement module 504 corresponds to a user, such as a cashier at a business, positioning a document (e.g. a check) onto a document positioning surface of a document bed, such as the document positioning surface 215 of document bed 205 described in conjunction with FIG. 2, above. By positioning the document on the document positioning surface, the user intends that the document remain in place during a scanning operation performed using the document scanner.

Operational flow proceeds to a scan module 506, which, in the various embodiments disclosed herein, corresponds to capture of information printed on a document using the document scanner. The scan module 506 generally corresponds to activation and movement of a scanning module over a document placed in a scanning location of a document scanner, to allow the various information capture devices (e.g. a contact image sensor, magnetic ink character reader, radial encoder, or other elements) to capture information printed on the document. In the case of a check, for example, image and character information is captured and used to process the check (e.g. check routing information, payor and payee information, check amount, date, signature image, etc.).

During operation of the scan module 506, the scanning module (e.g. scanning module 210 of FIG. 2) proceeds along the length of the document from a default starting position. Registration assemblies (e.g. assemblies 240 of FIGS. 2-4) assist in retaining the check in place by reducing the probability that a frictional force between the scanning module and document will cause the document to move during scanning, introducing skew and potentially causing image or character reading errors. During movement of the scanning module, an actuation surface initiates a reciprocating action to move a pin portion of the registration assemblies from an extended position to a retracted position as the scanning module moves through a defined distance. In certain embodiments, this reciprocating action occurs due to interaction between a tip (e.g. the parabolic tip as shown in FIG. 4) of a pin forming a part of each of the registration assemblies and a leading edge of the actuation surface, as previously described.

Operational flow proceeds to a processing module 508, which corresponds to use and/or storage of information captured by the document scanner. The processing module 508 can, in various embodiments, incorporate a variety of storage and usage operations. For example, the captured image and/or character data can be stored in a memory element of the document scanner (such as in a memory integrated onto a printed circuit board) or a computing system interconnected to the document scanner, or communicated across a network as illustrated in FIG. 1, wherein the data is sent to a remote location (e.g. a financial institution) for processing, reducing the time required for notifying a financial institution of the document information by bypassing the requirement of physical transport of the document. Operational flow terminates at an end operation 510, which corresponds with completed information capture from a document.

Referring now to FIGS. 1-5 generally, use of a document scanner with the registration assemblies described herein provides improved reliability in a scanning process by reducing a risk of skew due to document movement during scanning. This reduced risk of skew (and resulting errors caused by document skew) can save users time by reducing occurrences in which the user must rescan the document or otherwise correct scanning errors.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A document scanning device comprising:
   a document bed;
   one or more document retention devices positioned along the document bed to define a document positioning surface; and
   a scanning module slidably attached to the document bed to pass over the document positioning surface;
   wherein the one or more document retention devices retain a document in place on the document positioning surface as the scanning module slides over the document, each document retention device including a pin extending upward from a substantially flat surface of the document bed, the pin being a spring-biased pin movable between extended and retracted positions.

2. The document scanning device of claim 1, wherein the substantially flat surface includes the document positioning surface.

3. A document scanning device comprising:
   a document bed;
   one or more document retention devices positioned along the document bed to define a document positioning surface; and
   a scanning module slidably attached to the document bed to pass over the document positioning surface;
   wherein the one or more document retention devices retain a document in place on the document positioning surface as the scanning module slides over the document, a portion of each of the one or more document retention devices extending upward from the document bed is depressible into the document bed.

4. The document scanning device of claim 3, wherein the depressible portion of each of the one or more document retention devices is depressible to a position substantially level with the document positioning surface.

5. A document scanning device comprising:
a document bed;
one or more document retention devices positioned along the document bed to define a document positioning surface; and
a scanning module slidably attached to the document bed to pass over the document positioning surface;
wherein the one or more document retention devices retain a document in place on the document positioning surface as the scanning module slides over the document, the one or more document retention devices each include a pin at least partially extending upward through the document bed, the pin being a spring-biased pin movable between extended and retracted positions.

6. The document scanning device of claim 5, wherein the pin is positioned within a guide sleeve housing.

7. A document scanning device comprising:
a document bed;
one or more document retention devices positioned along the document bed to define a document positioning surface, the one or more document retention devices retain a document in place on the document positioning surface as the scanning module slides over the document; and
a scanning module slidably attached to the document bed to pass over the document positioning surface;
wherein the scanning module includes an actuation surface positioned to depress at least one of the one or more document retention devices to a retracted position as the scanning module slidably passes over the document positioning surface.

8. The document scanning device of claim 7, wherein the actuation surface is a beveled surface having an approximately 15 degree inclination relative to the document base.

9. The document scanning device of claim 7, wherein, in the retracted position, at least a portion of the document retention device extends above the document positioning surface.

10. The document scanning device of claim 7, wherein the one or more document retention devices includes a plurality of document retention devices located along at least two sides of a document positioning surface.

11. The document scanning device of claim 10, wherein the plurality of document retention devices are positioned such that a document retention devices is located along at least two edges of the document positioning surface.

12. The document scanning device of claim 7, wherein each document retention device includes a pin having a tip with a radius of curvature designed to introduce a drag force on the actuation surface.

13. The document scanning device of claim 7, wherein the document positioning surface is sized to receive a personal check.

14. The document scanning device of claim 7, wherein the scanning module includes a contact image sensor arranged to pass across a document at a level about 0.01 inches above the document when placed on a document positioning surface.

15. The document scanning device of claim 7, wherein the scanning module includes a magnetic character reader.

16. A document scanning device comprising:
a document bed;
one or more document retention devices positioned along the document bed to define a document positioning surface; and
a scanning module slidably attached to the document bed to pass over the document positioning surface;
wherein the one or more document retention devices retain a document in place on the document positioning surface as the scanning module slides over the document, the one or more document retention devices extending through the document bed to define a document positioning surface, the pin being a spring-biased pin movable between extended and retracted positions.

17. A method of capturing information from a printed document, the method comprising:
placing a document on a document positioning surface of a document bed, the document bed having a plurality of registration assemblies extending therethrough to retain the document in a stationary position during a document scanning procedure;
scanning at least a portion of the document by moving a scanning module across a surface of the document to capture information printed on the surface;
processing the scanned document information; and
depressing a portion of one or more registration assemblies with the scanning module while moving a scanning module across a surface of the document.

18. The method of claim 17, wherein scanning at least a portion of the document includes sliding the scanning module across the surface of the document.

19. The method of claim 17, wherein scanning at least a portion of the document includes scanning one or more magnetic characters with a magnetic character reader.

20. The method of claim 17, wherein scanning at least a portion of the document includes scanning an image of the document with a contact image sensor.

21. The method of claim 17, further comprising communicating the scanned document information to a computing system.

22. A check scanner comprising:
a document bed;
a plurality of document retention devices positioned on the document bed to define a check positioning surface, the plurality of document retention devices each including a spring-biased pin movable between extended and refracted positions; and
a scanning module slidably attached to the document bed to pass over the check positioning surface, the scanning module including an actuation surface facing the check positioning surface and arranged to, as the scanning module slides across the check positioning surface, engage one or more of the document retention devices, moving the devices from an extended position to a retracted position.

23. The check scanner of claim 22, wherein the check positioning surface is sized to receive a personal check.

24. The check scanner of claim 22, wherein the scanning module includes a magnetic character reader.

* * * * *

UNITED STATES PATENT AND TRADEMARK OFFICE
CERTIFICATE OF CORRECTION

| | | |
|---|---|---|
| PATENT NO. | : 8,111,435 B2 | Page 1 of 1 |
| APPLICATION NO. | : 12/145743 | |
| DATED | : February 7, 2012 | |
| INVENTOR(S) | : Moore et al. | |

It is certified that error appears in the above-identified patent and that said Letters Patent is hereby corrected as shown below:

At column 12, line number 47, delete "refracted" and insert -- retracted --.

Signed and Sealed this
Third Day of April, 2012

David J. Kappos
*Director of the United States Patent and Trademark Office*